(12) United States Patent
Mawby

(10) Patent No.: US 9,121,549 B2
(45) Date of Patent: Sep. 1, 2015

(54) CONDENSATE REMOVAL DEVICE

(75) Inventor: Sam Mawby, Bristol (GB)

(73) Assignee: THERMAL ENERGY INTERNATIONAL (UK) LTD, Bristol (GB)

( * ) Notice: Subject to any disclaimer, the term of this patent is extended or adjusted under 35 U.S.C. 154(b) by 248 days.

(21) Appl. No.: 13/581,069

(22) PCT Filed: Mar. 4, 2011

(86) PCT No.: PCT/GB2011/000308
§ 371 (c)(1),
(2), (4) Date: Sep. 19, 2012

(87) PCT Pub. No.: WO2011/110804
PCT Pub. Date: Sep. 15, 2011

(65) Prior Publication Data
US 2013/0008525 A1    Jan. 10, 2013

(30) Foreign Application Priority Data
Mar. 8, 2010    (GB) .................................. 1003821.4

(51) Int. Cl.
| | | |
|---|---|---|
| *F16T 1/34* | (2006.01) | |
| *B08B 9/043* | (2006.01) | |
| *B08B 9/00* | (2006.01) | |
| *F16K 29/00* | (2006.01) | |
| *F16L 55/07* | (2006.01) | |

(52) U.S. Cl.
CPC ... *F16T 1/34* (2013.01); *B08B 9/00* (2013.01); *B08B 9/0436* (2013.01); *F16K 29/00* (2013.01); *F16L 55/07* (2013.01)

(58) Field of Classification Search
CPC .............. F16T 1/00; F16T 1/34; F16K 29/00; F16L 55/07; B01D 27/10; B01D 35/14; B08B 9/00; B08B 9/0436
USPC ......... 137/171, 177, 179, 197, 314, 573, 574, 137/576, 549, 242, 244; 138/40, 44
See application file for complete search history.

(56) References Cited

U.S. PATENT DOCUMENTS

| | | | | |
|---|---|---|---|---|
| 2,074,690 | A * | 3/1937 | Gerdts ........................... | 137/177 |
| 2,116,626 | A | 5/1938 | Guildford | |
| 2,636,506 | A * | 4/1953 | St Clair ......................... | 137/177 |
| 2,783,770 | A | 3/1957 | Richter | |
| 4,938,246 | A * | 7/1990 | Conley et al. ............... | 137/15.07 |
| 5,060,686 | A * | 10/1991 | Troy .............................. | 137/171 |
| 5,137,556 | A | 8/1992 | Koulogeorgas | |
| 5,287,878 | A * | 2/1994 | Oike ............................. | 137/194 |
| 5,429,150 | A * | 7/1995 | Siefers, Jr. .................... | 137/177 |
| 5,948,128 | A * | 9/1999 | Stavropoulos et al. ......... | 55/466 |

FOREIGN PATENT DOCUMENTS

| | | |
|---|---|---|
| DE | 816 398 C | 10/1951 |
| GB | 2 304 300 A | 3/1997 |

* cited by examiner

*Primary Examiner* — William McCalister
*Assistant Examiner* — Ian Paquette
(74) *Attorney, Agent, or Firm* — Leason Ellis LLP

(57) ABSTRACT

An in-line venturi orifice trap (10) in which a condensate flow path (26) defined by the venturi is at an oblique angle with respect to the axis (18) of a pipeline in which the trap is to be mounted. With this configuration, the orifice (30) may be accessible (e.g. through a port (36) formed in a side wall of the trap or pipeline) without requiring removal of the steam trap from the pipeline.

17 Claims, 5 Drawing Sheets

CONDENSATE REMOVAL DEVICE

TECHNICAL FIELD OF THE INVENTION

The invention relates to devices for removing liquid condensate from gas-conveyed heat transfer systems whilst restricting gas escape. Such devices are often used for removing condensate from steam-conveying pipelines, where they are known as steam traps.

BACKGROUND TO THE INVENTION

Steam is commonly used in industry as a medium for transporting heat energy from a central location via suitable pipelines to its point of use. The heat energy conveyed in the steam may be released at a suitable point by causing a phase change of the steam from gas to liquid. The phase change releases latent heat from the steam and causes liquid condensate to form.

The condensate and any trapped air needs to be removed from the pipelines, because its presence can cause corrosion and reduce the system's heat transfer efficiency. However, any device for removing condensate also needs to prevent steam from escaping, as this also reduces the system's heat transfer efficiency and may waste the energy transported by that steam.

Traditionally, condensate is removed from pipelines using steam traps. Conventional steam traps comprise moving parts that are arranged to open in the presence of condensate to permit the condensate to drain out of the system and to close in the presence of steam. For example, conventional steam traps may operate mechanically, e.g. using floats and levers. Having parts which move relative to one another in use presents a significant maintenance burden because of an increased risk of failure. Mechanical steam traps may also exhibit limited efficiency, e.g. because of the amount of live steam that is allowed to escape during operation and especially if the steam trap fails when in the open position.

Orifice steam traps are known as an alternative to conventional steam traps. An example of a continuous flow fixed orifice (CFFO) steam trap is described in GB 2 304 300. In such devices, an orifice is located in the flow path of steam travelling through a pipeline. The size of the orifice is chosen carefully such that the condensate, which flows through it much more slowly than the steam, acts to block the steam from passing. The diameter of the hole can be very small, e.g. about 0.4 mm in some cases.

One type of orifice steam trap, known as a venturi orifice trap, has the orifice formed as part of a venturi, i.e. a conduit having a constricted passage therein, the constricted passage having a smaller cross-sectional area then the remainder of the conduit. In venturi orifice traps, the orifice is provided in the constricted part of the venturi, whereby condensate passing through the orifice enters a channel that opens out (e.g. flares outwardly) in the direction of flow. The orifice may thus be provided at the upstream end of a channel having an increasing cross-sectional area. The pressure drop after the orifice causes flash steam to form from the saturated condensate, whereby the venturi restriction is understood to regulate the condensate flow. Such channels have been used in venturi orifice steam trap demonstrated to operate over varying condensate flows without passing live steam. U.S. Pat. No. 4,745,943 describes such an arrangement. Venturi orifice traps are used in systems that exhibit varying loads, e.g. in which the amount of condensate and hence the flow rate of condensate through the trap varies over time (e.g. depending on the level of demand experiences by the heat transfer system).

Venturi orifice traps may be mounted in-line, wherein the venturi is parallel (e.g. coaxial) with the pipeline for conveying the steam. Alternatively, to permit retrofitting and facilitate cleaning of the orifice, it is also known to mount venturi orifice traps on the side of a "quick fit" connector pipe (e.g. a Spirax Sarco pipeline connecter), which itself is mounted in-line. In this arrangement the "quick fit" connector pipe acts to divert the steam to a chamber located out of the pipeline, from which the venturi directs the condensate back into the pipeline (e.g. to a condensate run-off section) in a direction perpendicular to the pipeline. An example of this type of venturi orifice trap is the Emerald Steam Trap manufactured by Gardner Energy Management Limited.

Steam-conveying pipelines used in heat transfer systems as described above contain many steam traps, since the system may have a total pipeline length of several kilometres, and typically a steam trap is required every 30-40 m. For example, an oil refinery may have over 10,000 steam traps distributed along steam pipeline, product trace and jacket heating networks, which may be provided to maintain the temperature of viscous fluids at a level to facilitate pumping.

SUMMARY OF THE INVENTION

At its most general, the present invention provides an in-line venturi orifice trap in which a condensate flow path defined by the venturi is at an oblique angle with respect to the axis of a pipeline in which the trap is to be mounted. With this configuration, the orifice may be accessible (e.g. through a port formed in a side wall of the trap or pipeline) without requiring removal of the steam trap from the pipeline. Angling the venturi may also enable the trap to be machined in one piece, so that the functions performed by the "quick-fit" connector and the side-mounted trap of the prior art can be combined in a single workpiece. Furthermore, the angled nature of the venturi may reduce the angle at which condensate passing therethrough impinges on the surface of a run-off pipe compared with the perpendicular arrangements of the prior art. This may reduce erosion.

Accordingly, the present invention may provide a condensate removal device for mounting in a pipeline, the device comprising: an inlet connectable to the pipeline to receive a condensable gas flow; an outlet connectable to the pipeline downstream of the inlet, the inlet and outlet being disposed on a pipeline axis through the device; and a condensate drainage channel providing fluid communication between the inlet and outlet, the condensate drainage channel having an entry port from which it extends in a condensate drainage direction towards the outlet, wherein the condensate drainage direction is at an oblique angle to the pipeline axis, and the condensate drainage channel includes a constricted passage that is occludable by condensate flow therethrough to restrict condensable gas flow therethrough.

The constricted passage, which may be the narrowest portion of the condensate drainage channel, may correspond to and perform the functions of an orifice in an orifice steam trap as discussed above. The constricted channel may be arranged to substantially prevent condensable gas flow therethrough in operation.

The constricted passage may comprise the entry port. Thus, the cross-sectional area of the entry port, which may be circular, may be selected to permit condensate flowing therethrough to occlude the condensate drainage channel to prevent gas from flowing therethrough. The constricted passage and/or the entry port may have a constant cross-sectional area. The constricted passage may be formed in an impermeable barrier that separates (e.g. isolates) the inlet from the outlet, e.g. by drilling, punching, lasering or the like. The barrier may be part of an insert receivable in the device, or may be an integrally formed part of the device.

The condensate drainage channel may increase in cross-sectional area as it extends away from the constricted passage in the condensate drainage direction. The condensate drainage channel may thus resemble a venturi. The increase in cross-sectional area of the condensate drainage channel away from (i.e. downstream from) the constricted passage may occur gradually, e.g. as a outward tapering of the channel, or stepwise.

The length of the condensate drainage channel and the its angle with respect to the pipeline axis may be selected to cause the entry port to protrude beyond a pipeline region defined as the volume enclosed by projecting the inlet onto the outlet. The oblique angle may be less than 45° (e.g. 40° or less, preferably 30°), to reduce the amount of erosion caused by the condensate impinging on the pipeline at an angle at the end of the condensate drainage channel. Having an angle less than 45° also facilitates machining the condensate drainage channel through the outlet.

The device may include a sealable access opening facing the entry port, the access opening being disposed outside of, e.g. offset from, the pipeline axis. The access opening may be sealable using a cap, plug or the like. The access opening may allow the entry port and/or constricted passage to be exposed to the outside of the device, e.g. for cleaning or maintenance. The access opening may be used during the manufacture of the device to receive a drill or the like for forming the constricted passage. Providing the access opening offset from the pipeline axis, e.g. on a side surface of the device that runs alongside the pipeline axis, may permit maintenance to be performed whilst the device is mounted in the pipeline.

All or part of the condensate drainage passage, e.g. the entry port and/or the constricted passage and/or the increase in cross-sectional area downstream from the constricted passage may be formed in the cap, whereby sealing the cap in the access opening mounts the condensate drainage passage between the inlet and outlet. The cap may thus correspond to the impermeable barrier insert discussed above.

Alternatively, where the condensate drainage passage is integrally formed in a body of the device, the device may be adapted to facilitate cleaning the entry port and/or constricted passage. For example, the internal side walls around the access opening may be shaped e.g. tapered to guide a cleaning tool e.g. with a cooperating shape towards the entry port. In another embodiment, the cleaning tool, which may be an elongate cleaning rod, may be attached to or formed integrally with a cap that is securable (e.g. via screw threads or the like) onto the access opening, wherein the cleaning rod is aligned with and receivable into the entry port upon mounting the cap on the access opening. Such a cleaning device may represent an independent aspect of the present disclosure.

The device may comprise a unitary body that houses an inlet chamber in fluid communication with the inlet and an outlet chamber in fluid communication with the outlet, wherein the condensate drainage channel provides fluid communication between the inlet chamber and outlet chamber. Herein, unitary body may mean a manufactured (e.g. machined) object having only one part. The impermeable barrier mentioned above may be an internal wall of the body, i.e. integrally formed therewith.

The entry port may be formed in a downstream wall of the inlet chamber. The downstream wall may have a convex shape with access to the entry port at its apex. For example, the downstream wall may have one or more sloping walls angled towards the apex. The sloping walls may be straight or curved. In one embodiment the downstream wall includes a conical section, with access to the entry port at its tip. This arrangement may reduce the tendency for particles in the condensate to congregate in the entry port and/or constricted passage because instead they with gather around the base of the sloping walls. Fouling or blocking of the condensate drainage channel may thus be reduced.

The inlet chamber may comprise a drainage sub-chamber and a filter sub-chamber in fluid communication with one another, the drainage sub-chamber being disposed downstream of the filter sub-chamber. The entry port may be accessed via the drainage sub-chamber.

The filter sub-chamber may include a filter (e.g. a basket-type filter) arranged to prevent debris carried by the condensable gas or condensate into the device from reaching the entry port. By filtering out debris in this manner, the time period between maintenance inspections can be increased. The oblique angle of the condensate drainage channel may enable the filter sub-chamber to be arranged in the device in a more compact manner, e.g. wherein the filter sub-chamber is angled in a manner to cooperate with the condensate drainage channel so that they overlap along the pipeline. This arrangement may enable the length of the device along the pipeline to be less than the length of an arrangement where a filter and steam trap are arranged in series along the pipeline. Moreover, having a separate filter or strainer may require an extra joint, which represents an additional potential leak path and hence an extra maintenance burden.

The filter sub-chamber may be sealable by mounting a filter cap on the device, e.g. over an opening into the filter sub-chamber. The filter cap may include a drainage valve e.g. to permit cleaning by blowing out debris.

The condensate drainage channel may comprise a tubular insert mounted, e.g. by an interference fit, in a bore formed in the body of the device. The bore may have a constant cross-sectional area. For example, the bore may be drilled from the outlet at an oblique angle relative to the pipeline axis. The tubular insert may have a variable internal cross-sectional area to provide the entry port and downstream increase in cross-sectional area of the condensate drainage channel. The tubular insert may be removably mounted in the bore. This may permit inserts with different internal dimensions to be used, e.g. depending on the properties (e.g. gas pressure) within the pipeline. Examples of suitable tubular inserts are shown in GB 2 088 246.

Preferably, the condensate drainage channel is integrally formed in the housing. As mentioned above, the oblique angle of the condensate drainage direction with respect to the pipeline axis may permit access from a first direction (e.g. through the outlet) to drill out the portion of the condensate drainage channel with a increasing cross-sectional area, and from a second direction (e.g. through the access opening mentioned above) to drill out the entry port and/or shape the surface (e.g. the downstream wall of the inlet chamber) in which the entry port is formed.

The entry port may be have a friction-reducing coating on its upstream facing surface. The friction-reducing coating may resist the tendency of debris to block the entry port, and facilitate cleaning thereof. The surface in which the entry port is formed, e.g. the convex surface mentioned above, may have a friction-reducing coating thereon. The friction-reducing coating may comprise any known material with a low friction coefficient, such as PTFE or the like. A PTFE coating may be baked on to the desired surface. Applying a friction-reducing coating around the orifice of a steam trap may represent an independent aspect of the present disclosure.

The unitary body of the device may be cast from a suitable material, e.g. stainless steel. The inlet, the outlet, the condensate drainage channel and the various chambers discussed above may be drilled out subsequently.

BRIEF DESCRIPTION OF THE DRAWINGS

An example of the invention is described below with reference to the accompanying drawings, in which.

DETAILED DESCRIPTION; FURTHER OPTIONS AND PREFERENCES

Figure 1:
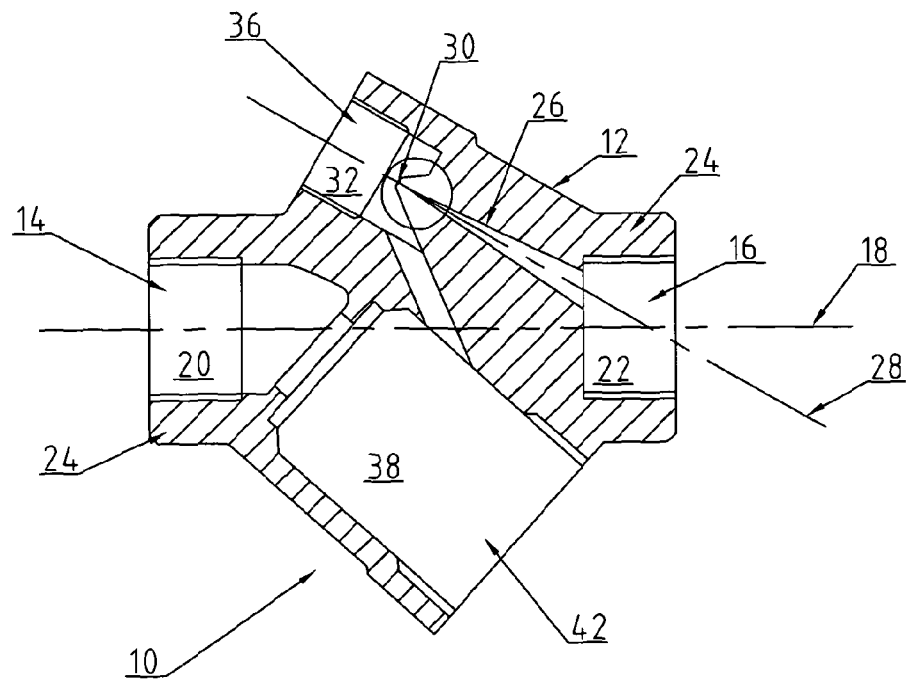
FIG. 1 is a section view of a condensate removal device according to a first embodiment of the invention.

FIGS. 1-5 show views of a condensate removal device (referred to below as a steam trap) 10 according to a first embodiment of the invention.

The steam trap 10 comprises a unitary body 12 cast from stainless steel or other suitable material. The body 12 has an inlet 14 and an outlet 16 formed on opposite sides thereof along a pipeline axis 18 that extends through the body 12. The inlet 14 and outlet 16 are apertures leading into an inlet bored region 20 and an outlet bored region 22 respectively.

The body 12 is adapted to the connected in a pipeline (not shown) that extends in the direction of the pipeline axis. The parts 24 of the body 12 surrounding the inlet 14 and outlet 16 may be arranged to connect to external piping. For example, the parts may be arranged to form any one or more of a screwed, socket weld, and flanged to an adjacent piece of piping. In one embodiment, the parts 24 may be equipped with "quick fit" connectors (also known a pipeline connectors or universal connectors), such as those used on the Emerald Steam Trap manufactured by Gardner Energy Management Limited. Alternatively or additionally, one or both of the parts 24 may comprise a standard end connection for a three-part valve (e.g. ball valve or check valve), whereby the steam trap may be integrated with the valve.

The inlet 14 is arranged to receive condensable gas and/or condensate from the external pipeline. The steam trap 10 includes a condensate removal channel 26 which is arranged to permit condensate to flow therethrough and escape through the outlet 16 and into a run-off pipe 11, whilst restricting or preventing the escape of the condensable gas. The outlet 16 is exposed to a lower pressure than the inlet 14, so that the condensable gas and condensate received in the inlet 14 are drawn into the condensate removal channel 26.

In this embodiment the inlet bored region 20 and the outlet bored region 22 are coaxial and have equal diameters, but this need not be essential for the invention.

The condensate removal channel 26 extends away from the outlet 16 along a condensate drainage direction 28 that is at an oblique angle (about 30° in this embodiment) with respect to the pipeline axis 18. An end of the condensate removal channel 26 opposite the outlet 16 comprises an entry port 30, which is show in more detail in FIG. 2. The entry port 30 comprises a constricted passage (i.e. the narrowest part of the condensate removal channel 26) which performs the function of the orifice in the steam trap. It is not essential for the constricted passage be formed in the entry port 30; it may be formed further downstream in the condensate removal channel 26. As it extends away from the entry port 30 along the condensate removal direction 28 towards the outlet 16, the condensate removal channel 26 flares open, i.e. gradually increases in cross-sectional area. In this embodiment, the condensate removal channel 26 has a circular cross-section, so the increase in cross-sectional area may be achieved by a linear increase in diameter of the condensate removal channel 26. When hot condensate is forced through the entry port 30 into the condensate removal channel 26, the pressure drop across the entry port results in flash boiling of the condensate, which in turn creates a variable restriction in the flow capacity of the condensate removal channel 26 which acts to inhibit passage of condensable gas through the entry port 30.

The entry port 30 has an upstream opening (34, see FIG. 2) located in a drainage sub-chamber 32, which is in fluid communication with the inlet 14 to receive the condensable gas and/or condensate. In this embodiment, the drainage sub-chamber 32 is accessible from the outside via an access opening 36. The access opening 36 may be used for maintenance, e.g. to clean the entry port 30, without removing the steam trap 10 from the pipeline. In use, the access opening 36 is closed by a cap or plug, as discussed below with reference to FIG. 3.

Whilst in some embodiments the inlet 14 may be in direct communication or formed integrally with the drainage sub-chamber 32, in the depicted embodiment the condensable gas and/or condensate travel from the inlet 14 to the drainage sub-chamber 32 via a filter sub-chamber 38. The filter sub-chamber 38 is a hollow region (e.g. a bored region) adapted to receive a strainer 40 (see FIG. 3). The strainer 40 comprises a perforated (e.g. meshed) sleeve that fits in the filter sub-chamber 38 to restrict the passage of debris into the drainage sub-chamber 32.

In this embodiment, the filter sub-chamber 38 is oriented at an oblique angle with respect to the pipeline axis, whereby it is accessible from the outside via an opening 42. The opening 42 may be used for maintenance, e.g. to clean or replace the strainer 40, without removing the steam trap 10 from the pipeline. In use, the opening 42 is closed by a cap or plug, as discussed below with reference to FIG. 3.

In this embodiment, the oblique angles of the filter sub-chamber 38 and the condensate drainage channel 26 cooperate to permit the filter sub-chamber 38 and the condensate drainage channel 26 to overlap in the direction of the pipeline axis. The steam trap 10 may thus be more compact in length (along the pipeline axis between the inlet 14 and outlet 16) than an arrangement in which the filter sub-chamber 38 and condensate drainage channel 26 where aligned in series with the pipeline axis.

The filter sub-chamber 38 is in fluid communication with the drainage sub-chamber 32 via a passageway 44, which may be drilled from one or both of the access opening 36 or opening 42. Alternatively, the passageway 44 may be integrally cast with the rest of the body.

Figure 2:
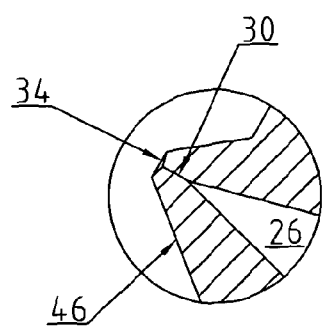
FIG. 2 is a close-up section view of the entry port of the condensate drainage channel in the condensate removal device of FIG. 1.

FIG. 2 shows a close-up section view of the entry port 30. The entry port 30 itself may comprise a narrow passageway through the material of the body. The diameter of the passageway, which may be constant, is selected in view of the properties of the pipeline (e.g. differential pressure between the inlet and outlet, composition of the condensable gas, etc.)

such that it permits the discharge of condensate at a desired rate. The calculations involved in this selection are the same as for known types of venturi orifice traps.

The surface of the drainage sub-chamber 32 surrounding the upstream opening 34 of the entry port 30 is shaped as a cone extending away from the outlet 16 in the condensate drainage direction. The convex surface of the cone (i.e. the sloping surfaces leading up to the upstream opening 34) may assist in prevent debris from settling over the entry port 30.

The sloping surface of the cone and the upstream facing surface of the opening 34 itself may have a coating 46 of friction-reducing material, e.g. PTFE or other suitable low friction or non-stick material. The friction-reducing coating may further resist accumulation of debris at the upstream opening 34 of the entry port 30.

Figure 3:
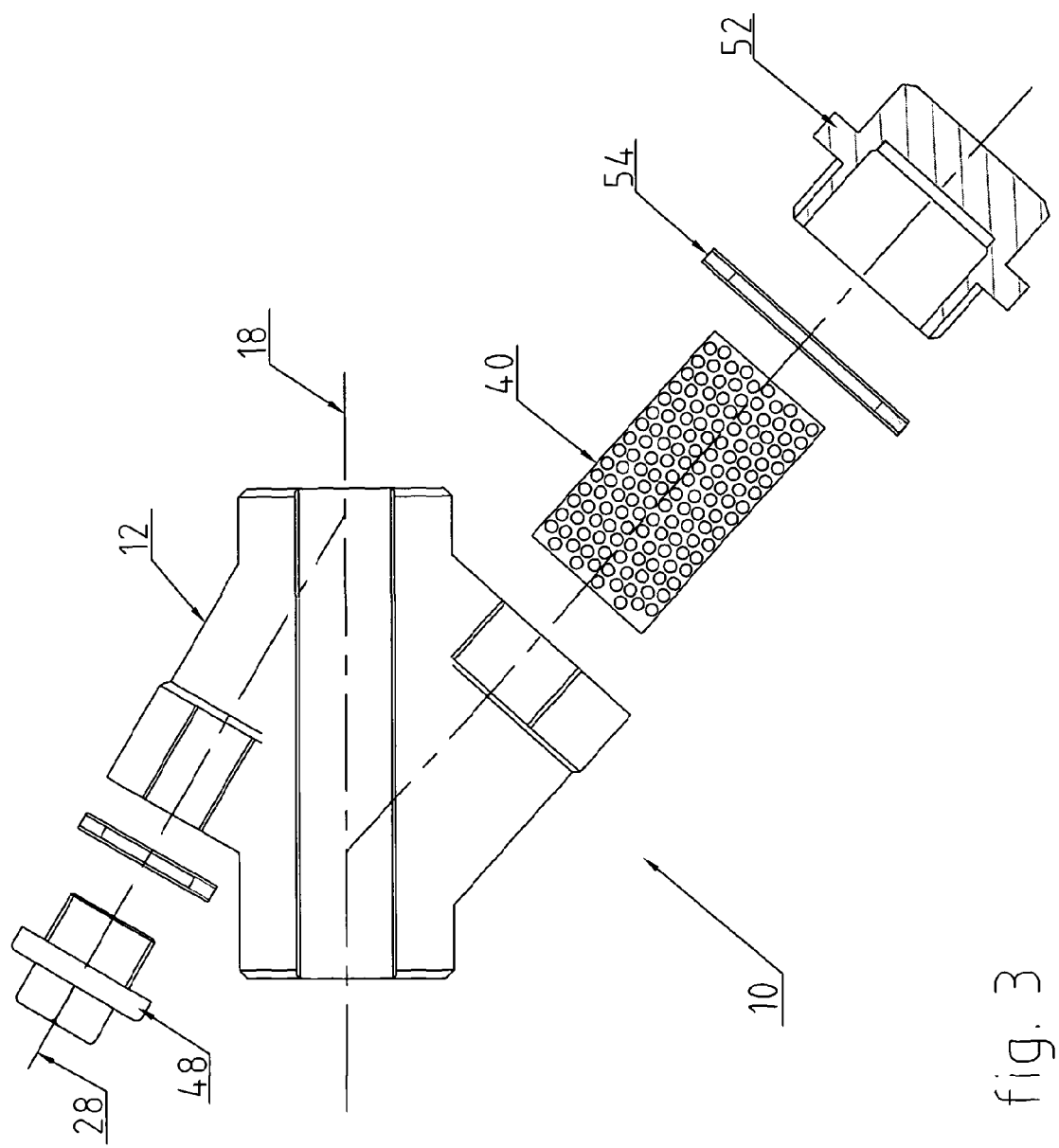
FIG. 3 is an exploded view of the condensate removal device of FIG. 1.

FIG. 3 shows an exploded view of all of the separate components of the steam trap 10. It can be understood that the body 12 is a single workpiece containing all of the inlet 14, outlet 16 and condensate drainage channel 26 (including entry port 30 and flared portion). As discussed above, the drainage sub-chamber 32 is closed in use by a cap 48, which may be threadably engaged with the internal surface of the drainage sub-chamber 32. The external threads on the cap 48 and the internal threads in the drainage sub-chamber 32 may have a friction-reducing coating similar to that discussed above in order to reduce or minimise galling. The cap 48 may engage the body 12 via a gasket 50. The gasket 50 may be 3 mm thick and may have a stainless steel body. The gasket may have a graphite coating.

Similarly, the filter sub-chamber 38 may be closed by a cap 52 and gasket 54 in a corresponding manner.

Figure 4:
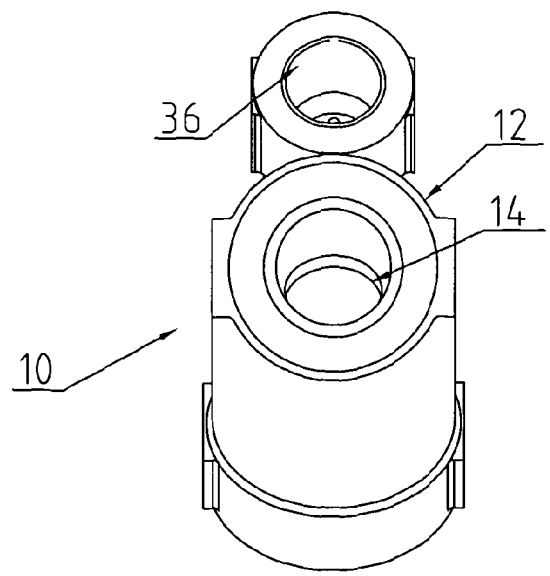
FIG. 4 is a plan view of the condensate removal device of FIG. 1, from the inlet portion.
Figure 5:
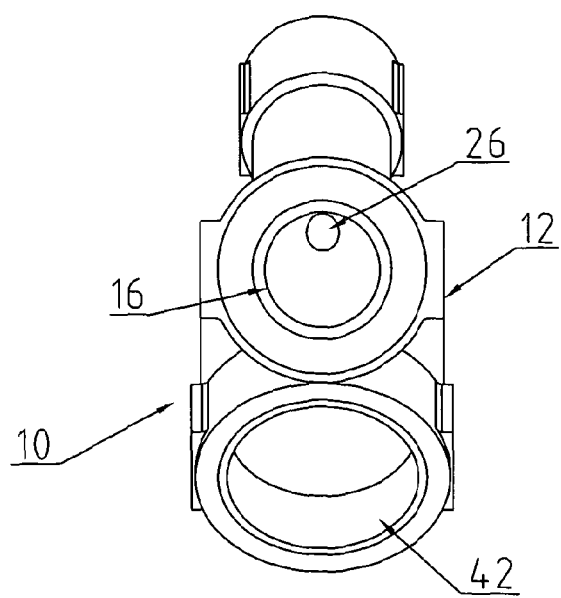
FIG. 5 is a plan view of the condensate removal device of FIG. 1, from the outlet portion.

FIGS. 4 and 5 show end views of the body 12 of the steam trap 10 with the caps 48, 52 removed. From FIG. 4 it may be appreciated that the entry port 30 is visible through access opening 36; the entry port 30 may be drilled from this direction. In FIG. 5, the condensate drainage channel 26 is visible through the outlet 16; the condensate drainage channel 26 may be ground from this direction.

Figure 6:
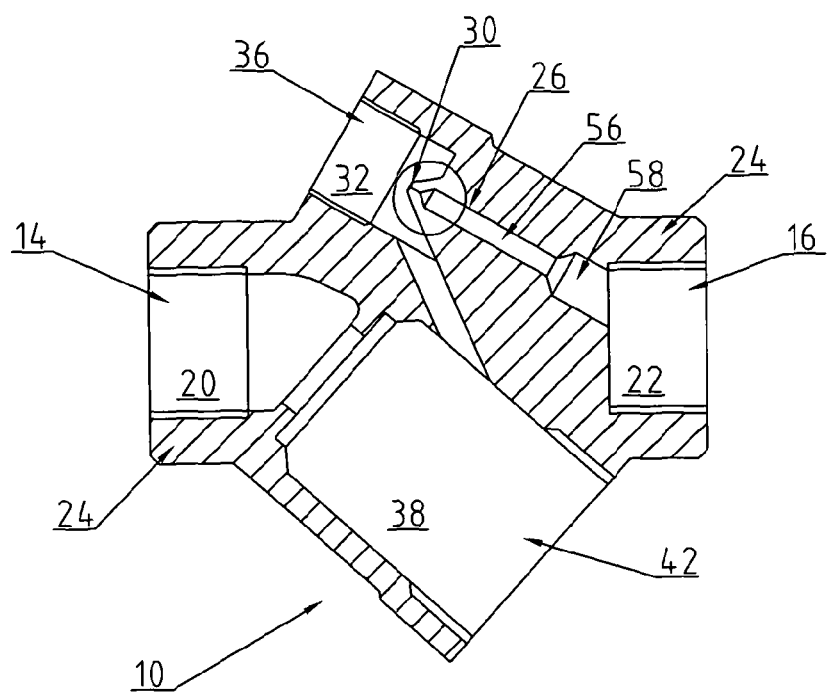
FIG. 6 is a section view of a condensate removal device according to a second embodiment of the invention.
Figure 7:
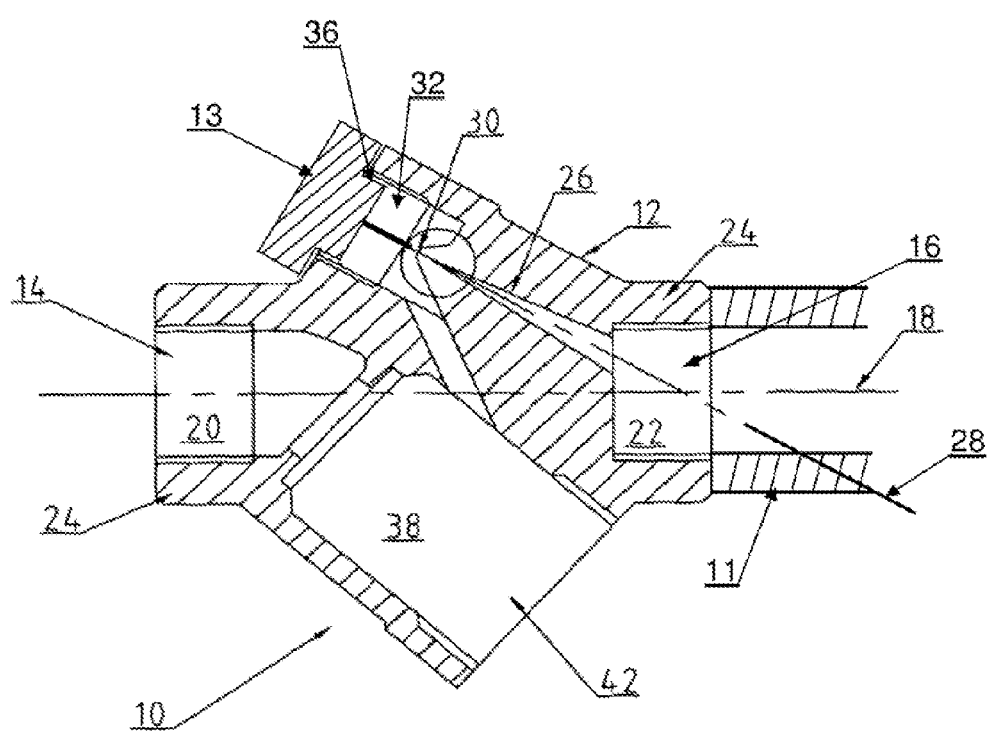
FIG. 7 is a section view of the condensate removal device of FIG. 1, further showing a run-off pipe at an outlet.

FIG. 6 is a section view of a steam trap 10 that is a second embodiment of the invention. Parts having the same function as the first embodiment are labelled with the same reference number and are not described again. The second embodiment differs from the first embodiment in that the increase in cross-sectional area of the condensate removal channel 26 occurs in a stepwise fashion. Thus, the condensate removal channel 26 opens out from the constricted passage in the entry port 30 to a upstream channel portion 56 having a first constant cross-sectional area (corresponding to a first diameter in this embodiment), which in turn opens out into a downstream channel portion 58 having a second constant cross-sectional area (corresponding to a second diameter in this embodiment). The first constant cross-sectional area (first diameter) is smaller than the second constant cross-sectional area (second diameter).

The invention claimed is:

1. A condensate removal device for mounting in a pipeline, wherein the condensate removal device is a continuous flow orifice steam trap comprising:
   an inlet connectable to the pipeline to receive a condensable gas flow;
   an outlet connectable to a run-off pipe of the pipeline downstream of the inlet, the inlet and outlet being disposed on a pipeline axis through the device; and
   a condensate drainage channel providing fluid communication between the inlet and outlet, the condensate drainage, channel haying an entry port from which it extends in a condensate drainage direction towards the outlet, wherein the condensate drainage direction is at an oblique angle to the pipeline axis, and the condensate drainage, channel includes a constricted passage that is occludable by condensate flow therethrough to restrict condensable gas flow therethrough, and
   wherein a condensate flow path out of the condensate drainage channel in the condensate drainage direction is arranged to impinge at the oblique angle on an inside surface of the run-off pipe.

2. A condensate removal device according to claim 1, comprising a sealable access opening facing the entry port, the access opening being offset from the pipeline axis.

3. A condensate removal device according to claim 1, wherein the entry port has a friction-reducing coating on its upstream facing surface.

4. A condensate removal device according to claim 1, wherein the oblique angle is 30°.

5. A condensate removal device according to claim 1, wherein the inlet comprises a drainage sub-chamber and a filter sub-chamber in fluid communication with one another, the filter sub-chamber having a debris filter mounted therein, and wherein the filter sub-chamber is offset from the condensate drainage channel across the pipeline axis.

6. A condensate removal device according to claim 5, comprising a sealable access opening formed in the drainage sub-chamber facing the entry port, the access opening being offset from the pipeline axis.

7. A condensate removal device according to claim 1, wherein the condensate drainage channel increases in cross-sectional area as it extends away from the constricted passage in the condensate drainage direction.

8. A condensate removal device according to claim 7, wherein the condensate drainage channel gradually flares outwards as it extends downstream from the constricted passage.

9. A condensate removal device according to claim 7, wherein the condensate drainage channel increases in cross-sectional area in a stepwise fashion as it extends downstream from the constricted passage.

10. A condensate removal device according to claim 1, comprising a unitary body housing an inlet chamber in fluid communication with the inlet and an outlet chamber in fluid communication with the outlet, wherein the condensate drainage channel provides fluid communication between the inlet chamber and outlet chamber.

11. A condensate removal device according to claim 10, wherein the entry port is formed in as downstream wall of the inlet chamber, the downstream wall having a convex shape with access to the entry port located at its apex.

12. A condensate removal device according to claim 11, wherein the downstream wall is cone-shaped.

13. A condensate removal device according to claim 11, wherein the downstream wall has a friction-reducing coating formed thereon.

14. A condensate removal device according to claim 10,wherein the inlet chamber comprises a drainage sub-chamber and a filter sub-chamber in fluid communication with one another, the drainage sub-chamber being disposed downstream of the filter sub-chamber and having the entry port located therein.

15. A condensate removal device according to claim 14, wherein the filter sub-chamber has a debris filter mounted therein.

16. A condensate removal device according to chum 14, wherein the filter sub-chamber is angled in a manner to cooperate with the condensate drainage channel so that the filter sub-chamber and the condensate drainage channel overlap along the pipeline.

17. A condensate removal device for mounting in a pipeline, wherein the condensate removal device is a continuous flow orifice steam trap comprising:
   an inlet connectable to the pipeline to receive a condensable gas flow;
   an outlet connectable to the pipeline downstream of the inlet, the inlet and outlet being disposed on a pipeline axis through the device;
   a condensate drainage channel providing fluid communication between the inlet and outlet, the condensate drainage channel having an entry port from which it extends in a condensate drainage direction towards the outlet, and a constricted passage that is occludable by condensate flow therethrough to restrict condensable gas flow therethrough;
   an access opening facing the entry port, the access opening being offset from the pipeline axis; and
   a cleaning device comprising a cap having a elongate rod projecting therefrom, the cap being secured onto the access opening with the elongate rod aligned in the condensate drainage direction and received in the entry port.

* * * * *